March 20, 1934.   F. ANZALONE ET AL   1,951,591
PROTECTION TERMINAL FOR BATTERIES
Filed Feb. 16, 1932

INVENTOR.
FRANK ANZALONE.
JOE SPOSITO.
VINCENTE GARCIA.
BY Townsend & Loftus
ATTORNEYS.

Patented Mar. 20, 1934

1,951,591

UNITED STATES PATENT OFFICE 1,951,591

PROTECTION TERMINAL FOR BATTERIES

Frank Anzalone, Joe Sposito, and Vincente Garcia, San Jose, Calif.

Application February 16, 1932, Serial No. 593,224

4 Claims. (Cl. 173—259)

In the use of storage batteries in automobiles great difficulty is experienced in connecting the line terminals to the battery terminals and in maintaining the connection, due to corrosion of the terminals and particularly after the battery has been in use for some time.

An object of the invention is to provide a terminal, by means of which good electrical connections between the line terminals and the battery terminals may be made and maintained, even after a considerable period of use.

Another object of the invention is to provide a connection by means of which the batteries may be quickly and easily connected into or disconnected from the electrical circuit.

Other objects will become apparent on reading the appended description.

The invention comprises a protective housing into which the battery terminal and the line terminal project and rest in good electrical contact with each other, the housing containing a medium which resists the ingress of acid and air thereinto, thus preventing oxidation or acid corrosion.

Referring to the accompanying drawing which forms a part of this specification and wherein there is illustrated the preferred form of the invention, Fig. 1 is a perspective view of a battery connected in circuit;

Figure 1:
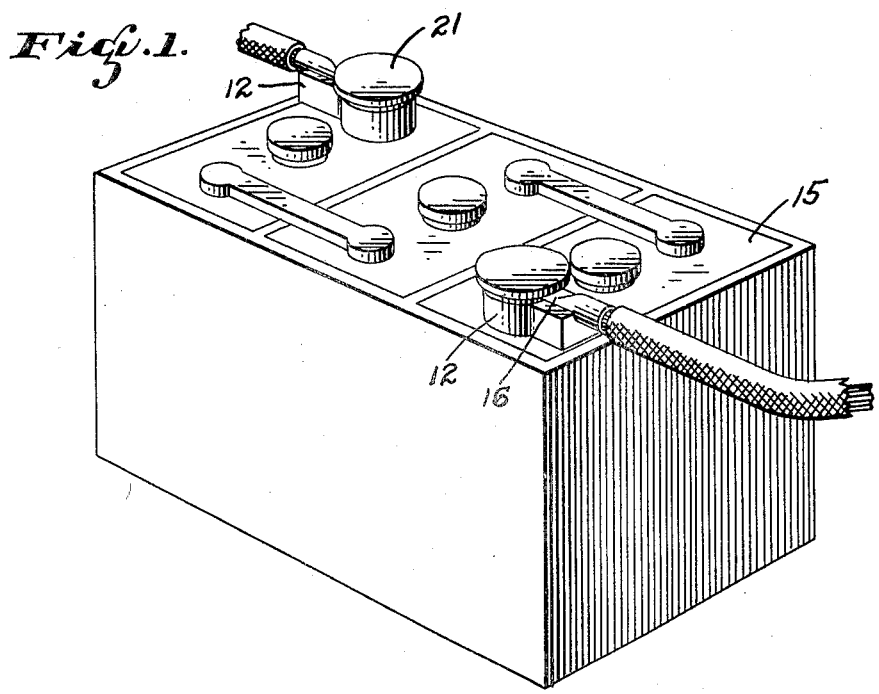
Figure 2:
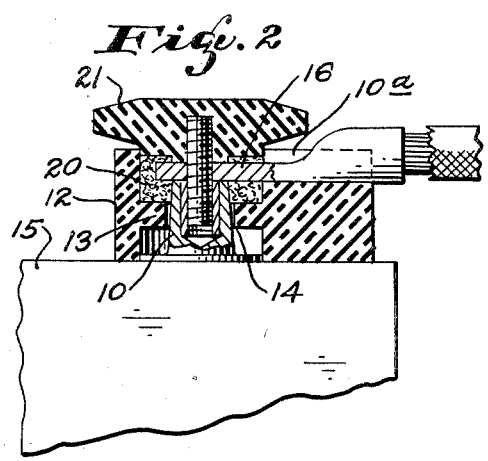
Fig. 2 is a sectional view of the novel connector showing a line terminal connected to a battery terminal.
Figure 3:
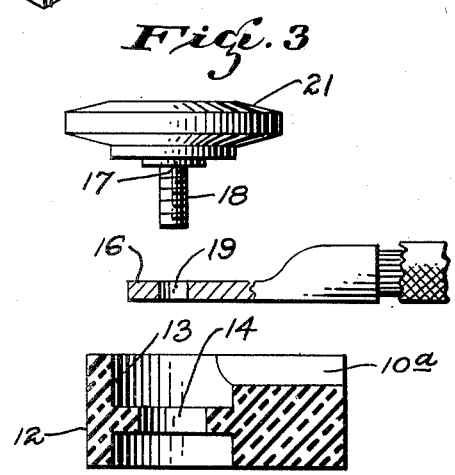
Fig. 3 is an exploded view of Fig. 2.
Figure 4:
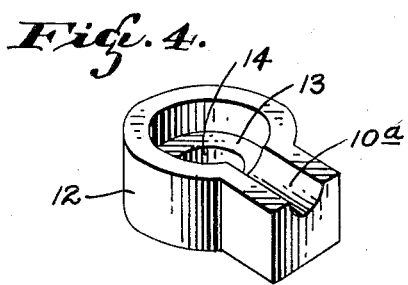
Fig. 4 is a perspective view of the casing.

Each battery terminal comprises a lead post 10, which is connected to either the positive or negative set of battery plates in a manner not illustrated because well known and forming no part of the present invention. An internally threaded ferrule or sleeve 11, of brass or other hard metal, is firmly connected, both mechanically and electrically, to the lead post within a concavity therein. This connection may be made in any suitable manner, as, for example, by forcing the sleeve into the cavity slightly smaller than the sleeve, with the application of pressure and heat. A shell 12 is formed of bakelite or other suitable insulating or non-corrodible material to have a web 13 preferably spaced from the ends thereof and perforated as at 14 to fit over the post 10 and permit such post to project thereabove, when the shell 12 in positioned thereon and rests on the battery top 15. With the shell so positioned, the flat end 16 of the usual line terminal is laid upon the upper end of the terminal post 10 and rests in a cut-away portion 10a of the shell, the two terminals being pressed and held together by means of a screw 17 having a threaded shank 18 attached to a hand-hold member 21, likewise consisting of bakelite or other non-corrodible material, the threaded shank 18 passing through the usual opening 19 of the line terminal and fitting into the threads of the sleeve 11.

It will thus be apparent that the cooperating conducting terminals may be pressed into tight contact with each other and so held merely by turning the screw member 17 in the proper direction, and they may be separated after turning the screw member sufficiently in the other direction.

The battery and line terminals are thus held in good electrical contact with each other within a housing formed by the web or transverse wall 13 and the upright walls thereabove, the member 19 functioning as a cover therefor. Within such housing, and packed around the contacting terminals, is felt or other absorbent material 20, impregnated or soaked with a material adapted to prevent the creeping of acid and preferably also adapted to exclude air, and oil or grease have been found very useful for this purpose. The felt soaked in oil or grease is compressed and packed around the contacting ends of the terminals when the cover member 21 is screwed down to tighten the contact between the terminals. If the material adapted to prevent creeping is sufficiently viscous it may be used alone without the felt. We use the term oil in the appended claims as including oil and grease, as well as other materials of a like nature.

While we have referred only to the preferred form of our invention, yet it is to be understood that this has been merely for the purpose of illustrating and describing it and not with any intention of limiting the invention, since the form described is capable of being modified in many ways without departing from the spirit of the invention.

Having thus described our invention, what we claim and desire to secure by Letters Patent is:

1. A protective device for battery terminals comprising a housing adapted to surround a battery terminal and having an opening, a line terminal extending through said opening to be connected to the top of the battery terminal, a cover for said housing having a portion extending into the housing, and a threaded connection between the cover and the battery terminal whereby placing the cover on the housing will cause it to engage the line terminal and press it against the battery terminal.

2. A protective device for battery terminals comprising a housing adapted to surround a battery terminal and having an opening, a line terminal extending through said opening and overlying the battery terminal, a grease-retaining substance in said housing, a cover for the housing having a portion extending into the housing, a threaded connection between the cover and the battery terminal whereby placing of the cover on the housing will cause it to engage the line terminal and press it against the battery terminal and to compress said grease-retaining substance.

3. A protective device for battery terminals comprising a housing adapted to surround the battery terminal and rest upon the surface of the battery adjacent to the terminal, said housing having an opening, a line terminal extending through said opening and overlying the battery terminal, and a single member serving as a cover for the housing, and having a threaded connection with the battery terminal whereby the housing may be secured with relation to the battery and the line terminal may be secured with relation to the battery terminal.

4. A protective device for battery terminals comprising a housing surrounding the battery terminal to retain a corrosion-resisting compound and having an opening, a line terminal extending through said opening and having an apertured end overlying the battery terminal, said battery terminal having a threaded socket formed therein, and a cover for the housing having a threaded stem extending through the aperture in the line terminal for reception by said socket whereby the cover may be secured in place to bind the line terminal to the battery terminal and seal the housing against the escape of the corrosion-resisting compound.

FRANK ANZALONE.
JOE SPOSITO.
VINCENTE GARCIA.